Figure 1:
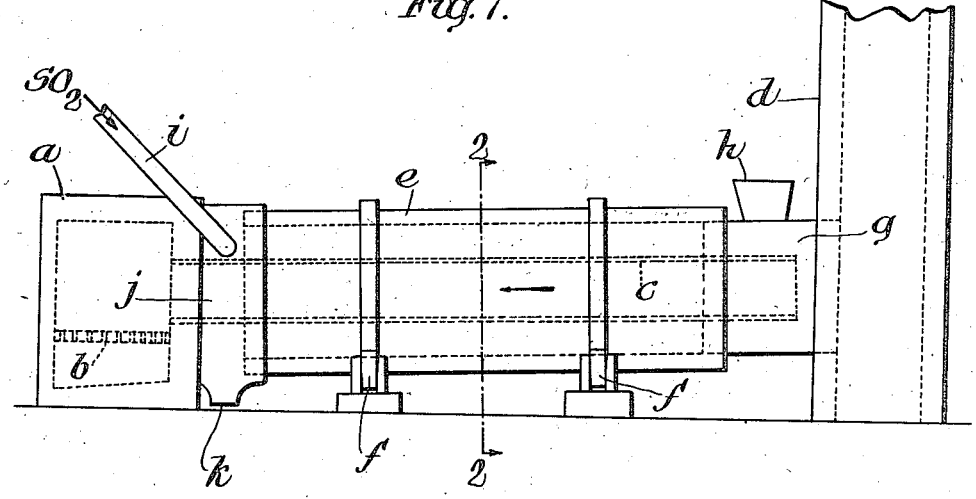

F. A. EUSTIS.
METHOD OF TREATING ORES OR METAL BEARING PRODUCTS.
APPLICATION FILED MAY 8, 1916.

1,230,143.

Patented June 19, 1917.

Inventor:
Frederic A. Eustis,
by Roberts, Roberts & Cushman
Attys.

UNITED STATES PATENT OFFICE.

FREDERIC A. EUSTIS, OF MILTON, MASSACHUSETTS.

METHOD OF TREATING ORES OR METAL-BEARING PRODUCTS.

1,230,143.  Specification of Letters Patent.  Patented June 19, 1917.

Application filed May 8, 1916. Serial No. 96,050.

*To all whom it may concern:*

Be it known that I, FREDERIC A. EUSTIS, a citizen of the United States, and resident of Milton, in the county of Norfolk and State of Massachusetts, have invented new and useful Improvements in a Method of Treating Ores or Metal-Bearing Products, of which the following is a specification.

This invention relates to a process for the extraction or recovery of nickel, aluminum, cobalt or manganese from an oxidized iron ore or metal-bearing product containing one or more of such metals, and relates particularly to the extraction of such metals by what may be termed the " wet " method, that is, by getting as large a part as practicable of such metals into solution and as small a part as practicable of the iron or other gangue substances into solution, and then precipitating such metals from the solution.

The process may be applied to the treatment of such ores as the soft iron ores of the north coast of the island of Cuba, which occur as blanket deposits on top of the rocks forming that part of the island. These ores consist essentially of oxids or oxids and silicates of iron and alumina, and contain also small amounts of the metals, nickel, manganese and chromium together with much water. The utility of the invention is, however, by no means confined to such Cuban iron ores, nor to any particular ore. The application of the process to such Cuban ores will admirably illustrate the principle of the invention, and the process will therefore be described as applied to such ores.

The principal object of the invention as applied to said Cuban ores is to render as large a part as possible of the nickel, aluminum and manganese soluble and as small an amount as practicable of the iron soluble. This is accomplished by heating the ore in a suitable furnace and introducing sulfur dioxid gas during the heating into intimate contact with the metal or metals to be made soluble in the manner hereinafter more fully explained and particularly pointed out in the claims.

In performing this heat treatment the ore which should be first thoroughly dried may be placed finely broken up in any suitable form of furnace in which the temperature can be controlled and into which sulfur dioxid gas, preferably mixed with a small amount of air, may be admitted while the heating is being performed. It is important that the ore be constantly turned over or agitated in the furnace so as to expose all parts of it to the action of the gases.

Figure 2:
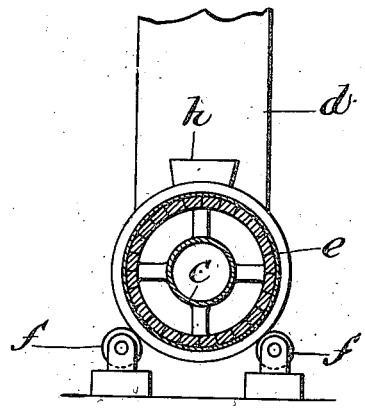

I will describe two types of apparatus which are particularly and perhaps equally well adapted for performing the process:

(1) The furnace may comprise a long nearly horizontal tube or cylinder, as illustrated in the drawings, in which Figure 1 is a side view of a conventional furnace suitable for performing the process; and Fig. 2 is a section on line 2—2 of Fig. 1. In the drawings, $a$ represents a brick fire box with a grate $b$ for a coal fire; $c$ is the flue for the furnace gases which are delivered into a stack $d$; $e$ is a rotating cylinder lined with bricks and mounted to rotate on rollers $f$; the flue $c$ is supported by and turns with the cylinder $e$; $h$ is a hopper delivering into a casing $g$ which opens into the cylinder $e$ around the flue $c$; $i$ is the pipe through which the $SO_2$ gas is introduced into the hood $j$; $j$ is a steel hood surrounding the delivery end of the cylinder, and $k$ is the outlet for the ore at the bottom of the hood $j$. The ore is introduced at the hopper $h$ whence it passes into the cylinder $e$, the rotation of which by any suitable means causes the ore to progress slowly from the intake end to the discharge end, the cylinder being inclined downward slightly toward its discharge end. The $SO_2$ gas is admitted through pipe $i$ from an ordinary pyrite burner and will necessarily be hot. The rotation of the cylinder $e$ causes the ore to be continuously turned over and all parts of it are thereby thoroughly exposed to and brought into intimate contact with the gases in the cylinder. If the gases do not contain sufficient heat to maintain the desired temperature, which should preferably be about 460 C. for the ore in question, additional heat may be supplied by the gases of combustion from the fire box passing through flue, or if desired, introduced directly into the cylinder $e$ with the $SO_2$. A measured and controllable amount of air is admitted through the pipe $i$ with the sulfur dioxid gas, the proportion of air to gas being determined by experience with each ore. With the ore in question good results will be obtained by the addition, roughly, of one part by volume of air to three of gas. Both the sulfur dioxid gas and the air, as well as the ore itself, are preferably dried before being admitted and are introduced into the cylinder of tube in a thoroughly dry state.

(2) Instead of performing the treatment in the tube above referred to, an ordinary shelf type of roasting furnace may be used in which the ore will be exposed on the several shelves or hearths as the gases are passed through the furnace. The ore may be constantly stirred or agitated by the usual rabbles attached to a rotating central shaft, and thus all parts of the ore will be brought into intimate contact with the gas. The ore will be admitted through the top of the furnace and will progress across each hearth in turn and from one hearth to another downwardly through the furnace. The sulfur dioxid gas will be admitted at the bottom of the furnace and will progress upwardly in the opposite direction from the course of the ore and will emerge at the top. The gas may be produced in an ordinary pyrite burner and be introduced at the bottom of the roasting furnace mixed with a measurable and controllable amount of air which has preferably been dried before admission. The proportion of air to the gas may be determined as already stated. If sufficient heat is not provided by the sulfur gases, the products of combustion of other fuel such as coal may be admitted as in the case of the rotary tube. Or, in this type of furnace the upper hearth may be used for heating the ore by the burning of producer gas or oil fuel in this part of the furnace. The upper hearth would in this event be sealed from the lower hearth and the sulfur dioxid gas would be taken away from the furnace immediately below the upper hearth exactly as is done with the chlorin gases in the well-known Ramen-Beskow type of furnace.

The heating of the ore while blowing into the furnace sulfur dioxid gas which is brought into intimate contact with the ore at the proper temperature, preferably about 460° C., results in rendering a far greater proportion of the nickel soluble than has been accomplished by any method heretofore proposed. Good results may be attained by the use of the sulfur dioxid gas alone, but I have discovered that the results are much improved by introducing a small amount of air with the sulfur gas, and by introducing the sulfur gas and the air dry.

In such ores as the Cuban nickel-iron ores referred to, as they occur in nature, it is very difficult to make the nickel soluble and if highly oxidized it becomes wholly insoluble; but if reduced it becomes amenable to treatment. Reduction by CO makes both iron and nickel soluble and defeats the purpose of separation of the metals, but reduction with $SO_2$ at the proper temperature leaves the iron insoluble and the nickel soluble. The sulfur dioxid gas has its maximum effect as a reducing agent when used alone without the addition of air, in which case the reducing of the oxidized ore furnishes a certain amount of oxygen. Somewhat better results, however, are secured by adding a relatively small amount of air to the sulfur dioxid gas to supply the needed oxygen, but only a small amount of air should be used so as not to depart from the reducing atmosphere or create an oxidizing condition under which no reduction would take place. Whether the process is worked without the addition of air, in which case the oxygen in the ore would be depended upon, or with the addition of a relatively small amount of air, it is a characteristic feature of the invention that the material is heated in a reducing atmosphere containing an excess of sulfur dioxid gas which has preferably been previously dried.

Small amounts of pyrite may be mixed with the ore before it is charged to the roasting furnace, and while not essential to the process produces a beneficial effect in reducing the amount of the gas treatment required. This addition of pyrite may be practised in either of the forms of furnaces mentioned.

Under this heat treatment in the presence of the sulfur dioxid gas which is introduced during the heating, relatively large amounts of nickel and alumina are rendered soluble, while a relatively small amount of iron or other gangue is made into sulfate.

After the heat treatment the resulting product is subjected to a leaching treatment. The best solvent which I have discovered for the nickel in the ore is sulfuric acid which should be used dilute. With dilute acid the nickel will readily go into solution. The above described gas treatment however, makes it possible to use water alone with very good results. I also recommend using the solvent boiling hot, that is, at a temperature of 100° C., whereby very little of the iron is dissolved since iron is less soluble in a hot solution, whereas nickel and alumina are more soluble. I also find it is desirable to continue the boiling of the solution even after all the soluble nickel has been taken into solution, as this treatment precipitates most of the little iron which may have gone into solution, and moreover precipitates it free from sulfur, practically all of the sulfur compounds remaining in solution.

Having got the nickel into solution together with a certain amount of alumina and a little iron, the sulfate solution may be subjected to precipitation treatments by any well known or preferred method. If several metals are to be recovered they may be precipitated in turn. Or the solutions may be utilized as in the process set forth in the application of Eustis and Perin. The specific leaching and precipitation steps are not essential to the invention which relates chiefly to the heating of the ore or metal bearing material in the presence of sulfur dioxid gas introduced as above set forth into intimate contact with the material under treatment.

I claim:

1. The method of treating an oxidized iron ore or metal-bearing product containing one or more of the metals, nickel, cobalt, aluminum or manganese, for the purpose of rendering a relatively large amount of such metals soluble while rendering a relatively small amount of the iron soluble, which consists in heating the material in the presence of an atmosphere containing an excess of sulfur dioxid gas and bringing the material under treatment and the gas into intimate contact.

2. The method of treating an oxidized iron ore or metal-bearing product containing one or more of the metals, nickel, cobalt, aluminum or manganese, for the purpose of rendering a relatively large amount of such metals soluble while rendering a relatively small amount of the iron soluble, which consists in heating the material in the presence of an atmosphere containing an excess of previously dried sulfur dioxid gas, and bringing the material under treatment and the gas into intimate contact.

3. The method of treating an oxidized iron ore or metal-bearing product containing one or more of the metals, nickel, cobalt, aluminum or manganese, for the purpose of rendering a relatively large amount of such metals soluble while rendering a relatively small amount of the iron soluble, which consists in heating the material in the presence of an atmosphere containing an excess of sulfur dioxid gas mixed with a relatively small amount of air and bringing the material under treatment and the gas into intimate contact.

4. The method of treating an oxidized iron ore or metal-bearing product containing one or more of the metals, nickel, cobalt, aluminum or manganese, for the purpose of rendering a relatively large amount of such metals soluble while rendering a relatively small amount of the iron soluble, which consists in first drying the material to be treated, and then heating the material in the presence of an atmosphere containing an excess of sulfur dioxid gas and bringing the material under treatment and the gas into intimate contact.

5. The method of treating an oxidized iron ore or metal-bearing product containing one or more of the metals, nickel, cobalt, aluminum or manganese, for the purpose of rendering a relatively large amount of such metals soluble while rendering a relatively small amount of the iron soluble, which consists in heating the material in the presence of an atmosphere containing an excess of sulfur dioxid gas and bringing the material under treatment and the gas into intimate contact, and thereafter leaching the material with a suitable solvent used boiling hot, and continuing the boiling to precipitate iron.

6. The method of treating an oxidized iron ore or metal-bearing product containing one or more of the metals, nickel, cobalt, aluminum or manganese, for the purpose of rendering a relatively large amount of such metals soluble while rendering a relatively small amount of the iron soluble, which consists in heating the material in the presence of an atmosphere containing an excess of sulfur dioxid gas at substantially atmospheric pressure and bringing the material under treatment and the gas into intimate contact.

Signed by me at Boston, Massachusetts, this 6th day of May 1916.

FREDERIC A. EUSTIS.